United States Patent [19]

Kuwahara

[11] Patent Number: 5,337,350
[45] Date of Patent: Aug. 9, 1994

[54] FACSIMILE APPARATUS WITH TELEPHONE SYSTEM

[75] Inventor: Tetsuya Kuwahara, Shiga, Japan

[73] Assignee: Murata Kikai Kabushiki Kaisha, Kyoto, Japan

[21] Appl. No.: 787,017

[22] Filed: Nov. 4, 1991

[30] Foreign Application Priority Data

Nov. 9, 1990 [JP] Japan .................................. 2-304644
Dec. 11, 1990 [JP] Japan .................................. 2-409962

[51] Int. Cl.$^5$ ............................................ H04M 11/00
[52] U.S. Cl. ............................. 379/100; 379/94; 358/400
[58] Field of Search ................ 379/100, 93, 94, 96, 379/97, 98; 358/400, 442, 468

[56] References Cited

U.S. PATENT DOCUMENTS

| | | | |
|---|---|---|---|
| 4,800,439 | 1/1989 | Yoshino | 379/100 |
| 4,815,121 | 3/1989 | Yoshida | 379/100 |
| 4,868,865 | 9/1989 | Ogawa et al. | 379/100 |
| 5,086,455 | 2/1992 | Satomi et al. | 379/100 |

*Primary Examiner*—Curtis Kuntz
*Assistant Examiner*—Jason Chan
*Attorney, Agent, or Firm*—Spensley Horn Jubas & Lubitz

[57] ABSTRACT

A facsimile apparatus with telephone system is provided with a facsimile system and an automatic call recording telephone system for transfer to the facsimile reception after connection of automatic call recording by detecting the CNG signal, or the silent condition for the predetermined period and comprises a timer which starts operation after connection for automatic call recording and a controller which does not detect the silent condition for the predetermined period after measuring the predetermined time by the timer.

1 Claim, 4 Drawing Sheets

FACSIMILE APPARATUS WITH TELEPHONE SYSTEM

BACKGROUND OF THE INVENTION

1. Field of the Invention

The present invention relates to a facsimile apparatus with telephone system and a receiving method of a facsimile apparatus providing an automatic call recording mode.

2. Prior Art

Certain facsimile apparatus are provided with two telephone terminals for connection of a telephone set (TEL 1) only for facsimile and an external telephone set or automatic call recording telephone set (TEL 2).

Operations of such facsimile apparatus will be explained hereunder. Namely, it is decided whether or not a ringing signal of 16 Hz has been received from an exchange through the telephone line. Next, the number of times the ringing signals are received is counted. Then it is decided whether the handset of TEL 1 has been lifted whether a call has been terminated to the telephone set TEL 2 (which has the automatic call recording mode). Two or six times of ringing of the bell by the ringing signal means the call has been terminated to the TEL 2 having the automatic call recording mode.

If the ringing of bells is counted up to seven times, and the handset of TEL 1 has not been lifted and the call has not been terminated to TEL 2 having the automatic call recording mode, then the facsimile reception process is executed.

Meanwhile, when the handset of TEL 1 has been lifted or the call has been terminated to TEL 2 having the automatic call recording mode, it is decided whether or not a CNG signal has been transmitted or whether a silent condition is continued for a predetermined period. If the CNG signal has been transmitted, then a distant party executes the facsimile reception process by deciding the automatic transmission in the facsimile mode. On the other hand, if the silent condition is continued for the predetermined period, then a distant party executes the facsimile reception process by deciding the manual transmission in the facsimile mode.

However, if a distant party has originated a call and the TEL 2 having the automatic call recording mode is recording a message, a silent period may sometimes occur for the predetermined period because, for example, the distant party may stop transmission of the message. In this case, the conventional apparatus usually changes the operation mode to the facsimile reception mode by detecting such silent condition for the predetermined period.

It is therefore an object of the present invention to provide, considering such background, a facsimile apparatus with a telephone system which eliminates such problem.

In a facsimile apparatus providing an automatic call recording mode as explained above, the manual reception mode realizes reception of call terminated only by telephone system. For the termination of call, a called party is capable of making conversation with a calling party through the telephone system. In a case where the calling party requests the transmission of facsimile data during the conversation, the facsimile apparatus may be changed to the facsimile reception mode using this manual reception mode. When the facsimile signal is terminated, in place of a call, it can be detected from the sound heard from the handset being taken off hook. Therefore, facsimile reception can be realized by switching the operation mode to the facsimile reception mode with an operating button switch.

In the facsimile automatic reception mode, the operation mode is automatically switched to the facsimile reception mode after the bell rings for predetermined number of times, for example, five times. When the handset is taken off hook while ringing of bell of five times, the operation mode is transferred to the telephone conversation mode. Therefore, if the facsimile signal is terminated when-the handset is taken off hook, the facsimile apparatus is changed to the facsimile reception mode for reception-of facsimile signal.

On the other hand, when the facsimile apparatus is set to the automatic call recording mode, if the handset is not taken off hook within a predetermined number of rings, for example, three rings, then the apparatus is transferred to the automatic call recording mode and a message for recording conversation is transmitted and the message from the calling party is recorded. In the case of automatic call recording mode, if a facsimile signal is received by the automatic facsimile transmission mode, facsimile reception is disabled.

Therefore, a facsimile apparatus, which provides the function of automatically switching the automatic call recording mode and the facsimile reception mode, wherein the automatic call recording mode is transferred to the facsimile reception when a facsimile signal is received through detection of a CNG signal, has been developed.

FIG. 4 is a flowchart illustrating the automatic call recording/automatic facsimile reception switching mode as explained above. When a call is received, the flowchart starts. In the step S111, the number of times of ringing of bell is counted. When the ringing of the bell is counted three times, the apparatus is connected to the line in the step S112, considering that the apparatus is internally in the off-hook condition. Thereafter, in the step S113, the CNG signal is detected. If a call is received, then the CNG signal will not be detected. Therefore, operation transfers to the step S114 and the transmission of message for recording conversation and the ordinary automatic recording of conversation are carried out. Upon completion of the transmission and recording, the flowchart comes to the end. In the step S113, when if a CNG signal is detected, then operation transfers to the step S115 and the facsimile reception procedures are executed.

When the apparatus is set to the automatic call recording mode, if a call is received while a person is at home, then, the operation transfers to the step S117 from the step S116 in a case where the handset is taken off hook within three rings of the bell, thereby entering the telephone conversation mode. It is now possible to make conversation as explained above. In the case of facsimile transmission, the apparatus is switched to the facsimile reception mode with an operating button for facsimile reception.

Since the automatic call recording/automatic facsimile reception switching function does not become effective if a call is not received to the automatic call recording telephone set, a call cannot be received in some cases to the automatic call recording telephone set in the step S112 because such telephone set is defective and the handset cannot be set to the off-hook condition. In this case, a problem arises in that if a facsimile signal is received, reception is disabled.

The present invention has been proposed to solve such problem and it is therefore another object of the present invention to provide a facsimile reception method which ensures facsimile reception even if a fault occurs in the automatic call recording telephone system.

SUMMARY OF THE INVENTION

The facsimile apparatus with telephone system is provided with a facsimile system and an automatic call recording telephone system for transfer to the facsimile reception after connection of automatic call recording by detecting the CNG signal, or the silent condition for the first predetermined period and is characterized in comprising a timer which starts operation after connection for automatic call recording and a controller which does not detect the silent condition for the first predetermined period after measuring the second predetermined time by the timer.

According to the composition explained above, the silent condition for predetermined period is detected only during the predetermined period after starting conversation of the automatic call recording telephone system and the apparatus transfers to the facsimile reception mode when the silent condition for predetermined period is detected during such period. Meanwhile, after the predetermined period, the silent condition for the predetermined period is not detected. Therefore, even when the silent period for predetermined period is generated, the apparatus is never transferred to the facsimile reception mode. Namely, even if the silent condition for the predetermined period is generated because voices are ceased during recording of message, the automatic call recording condition is maintained and message recording can be continued.

Moreover, the present invention relates to the facsimile reception method which comprises the automatic call recording mode and preferentially transfers to the automatic call recording mode after the predetermined number of times of ringing of bell, characterized in preferentially transferring to the facsimile reception mode if it does not transfer to the automatic call recording mode even after the predetermined number of times of ringing of bell.

BRIEF DESCRIPTION OF THE DRAWINGS

FIG. 1 is a block diagram indicating the schematic composition of a facsimile apparatus with telephone system and FIG. 2 is a flowchart indicating the reception process of facsimile apparatus with telephone system.

DESCRIPTION OF THE PREFERRED EMBODIMENT

An embodiment of the present invention will be explained hereunder with reference to FIG. 1 and FIG. 2.

Figure 1:
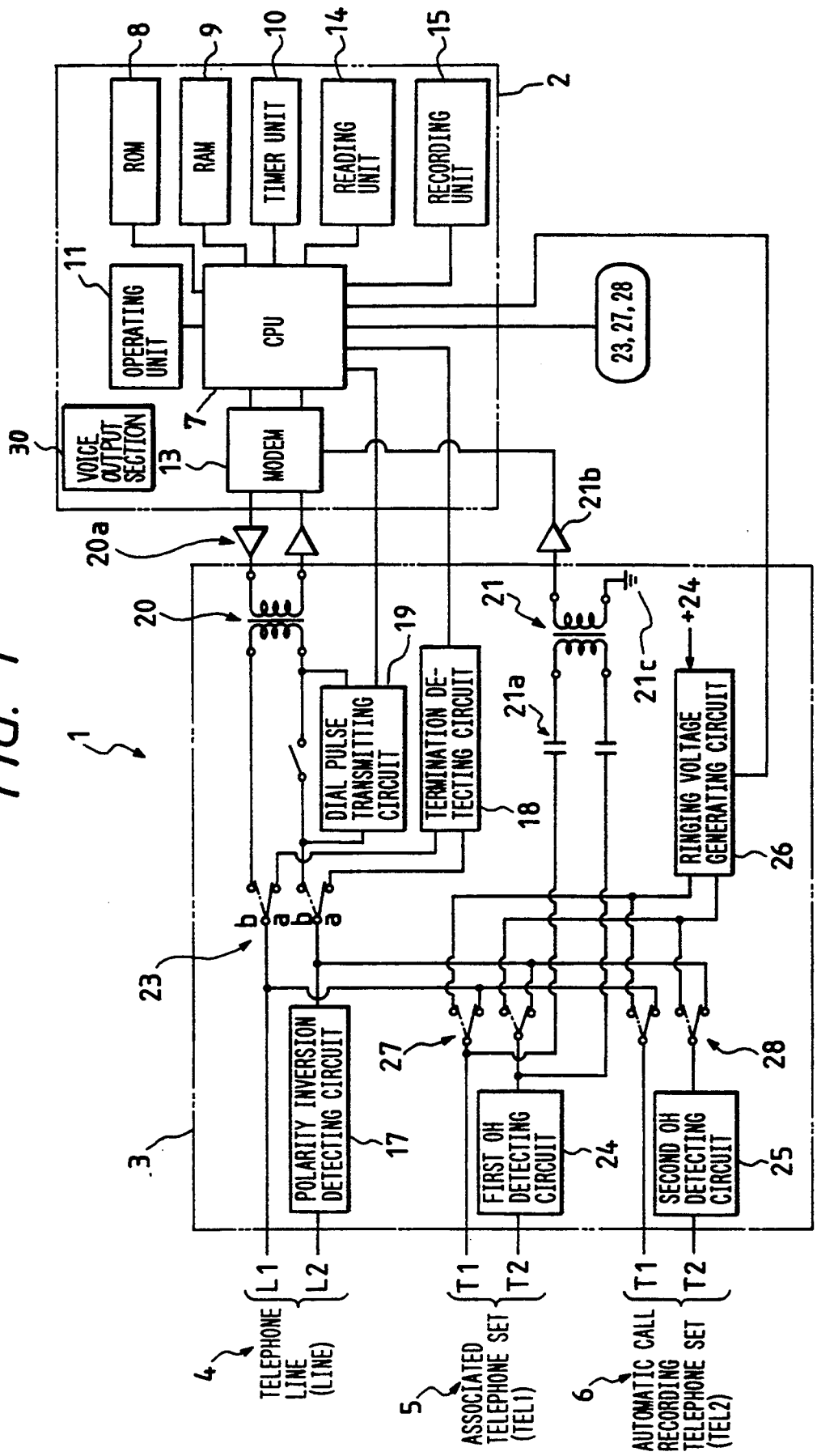
FIG. 1 and FIG. 2 indicate an embodiment of the present invention.

FIG. 1 is a block diagram indicating the total composition of a facsimile apparatus with telephone system to which the present invention is applied.

The facsimile apparatus 1 comprises a facsimile unit 2 providing the facsimile transmitting and receiving function and an NCU (network control unit) 3 for controlling connection between the telephone line 4 and the facsimile unit 2. The NCU 3 is connected with an associated telephone set 5 and an automatic call recording telephone set 6. The associated telephone set 5 performs an ordinary telephone function and the automatic call recording telephone set 6 performs an automatic call recording function.

The facsimile unit 2 is provided with a CPU 7 for totally controlling transmission and reception of the facsimile apparatus 1. CPU 7 executes the control operation in accordance with an operation program which is previously stored in a ROM 8. A variety of data generated with progress of this operation program are stored in a RAM 9. Moreover, the CPU 7 detects not only multiple signals (the CNG signal, for example) sent from the transmitting side in the facsimile reception mode but also detects the silent condition for the predetermined period, and makes control not to detect the silent condition for the predetermined period, depending on the passage of time after the termination of call for message recording as measured by a timer 10 (described later).

In addition to CPU 7, the facsimile unit 2 further comprises a timer 10, an operating unit 11, a modem (modulator/demodulator) 13, relays 27, 28, a reading unit 14 and a recording unit 15. The timer 10 is capable of setting a time limit for the time required by transmission and reception of answer signal with a calling party, setting a time limit corresponding to the recording time of the automatic call recording telephone set 6 and also measuring passage of time after establishing connection of telephone. Moreover, the relays 27, 28 are used for incoming of call without ringing of bell.

The operating unit 11 is provided for various input operations and includes various keys such as ten-key and function keys, etc. The modem 13 has a function to generate the push-tone signal corresponding to the telephone number of distant parties for modulating and demodulating transmitting and receiving signals. The reading unit 14 reads a document image to be set, during transmission, to the facsimile unit 2, converts the image data into electrical signal and then inputs such electrical signal to the CPU 7. The recording unit 15 prints out the image data received by the receiving operation on a recording sheet.

Meanwhile, an NCU 3 has following composition. A polarity inversion detecting circuit 17 is provided for detecting polarity inversion when a DC loop in the side of telephone exchange (not illustrated) is closed. The reference numeral 18 denotes a incoming detecting circuit which detects the ringing signal of 16 Hz transmitted from the telephone exchange through the telephone line 4 and inputs the detected result to the CPU 7. A dial pulse transmitting circuit 19 transmits, when the facsimile apparatus 1 is in the calling side, the dial pulse corresponding to the telephone number of the distant party through the telephone line 4. This transmitting operation is controlled by the CPU 7.

The reference numeral 20 denotes a transformer which is connected to the modem 13 through an amplifier 20a. Connection between the modem 13 and telephone line 4 and connection between the termination detecting circuit 18 and telephone line 4 are selectively established by a CML relay switch 23. Namely, when the CML relay switch 23 is set to the position a indicated by a solid line in the figure, the telephone line 4 is connected with the incoming detecting circuit 18, while when the CML relay switch 23 is set to the position b indicated with a chain line in the figure, the telephone line 4 is connected to the modem 13 through the transformer 20. The switching position of CML relay switch 23 is controlled by the CPU 7.

NCU 3 is provided with a first OH detecting circuit 24 for detecting the off-hook condition of the associated telephone set 5 and a second OH detecting circuit 25 for detecting the off-hook condition of the automatic call recording telephone set 6. The associated telephone set 5 and automatic call recording telephone set 6 are respectively connected with a ringing voltage generating circuit 26 and telephone line 4.

The ringing voltage generating circuit 26 is formed by a DC-DC converter and a switching circuit (not illustrated). Responsive to input of the ringing signal of 16 Hz from CPU 7, the ringing voltage generating circuit 26 generates a pseudo ringing signal to ring the associated telephone set 5 and automatic call recording telephone set 6 and also supplies a constant current of 40 mA~50 mA when the telephone set 5 or 6 is in the off-hook condition. As the ringing system, a bell may be used or a buzzer may also be used.

The reference numeral 30 denotes a voice output section, which is formed by a voice ROM and a speaker not illustrated. Upon reception of a voice generating signal from CPU 7, the voice output section outputs the predetermined voice message.

Figure 2:
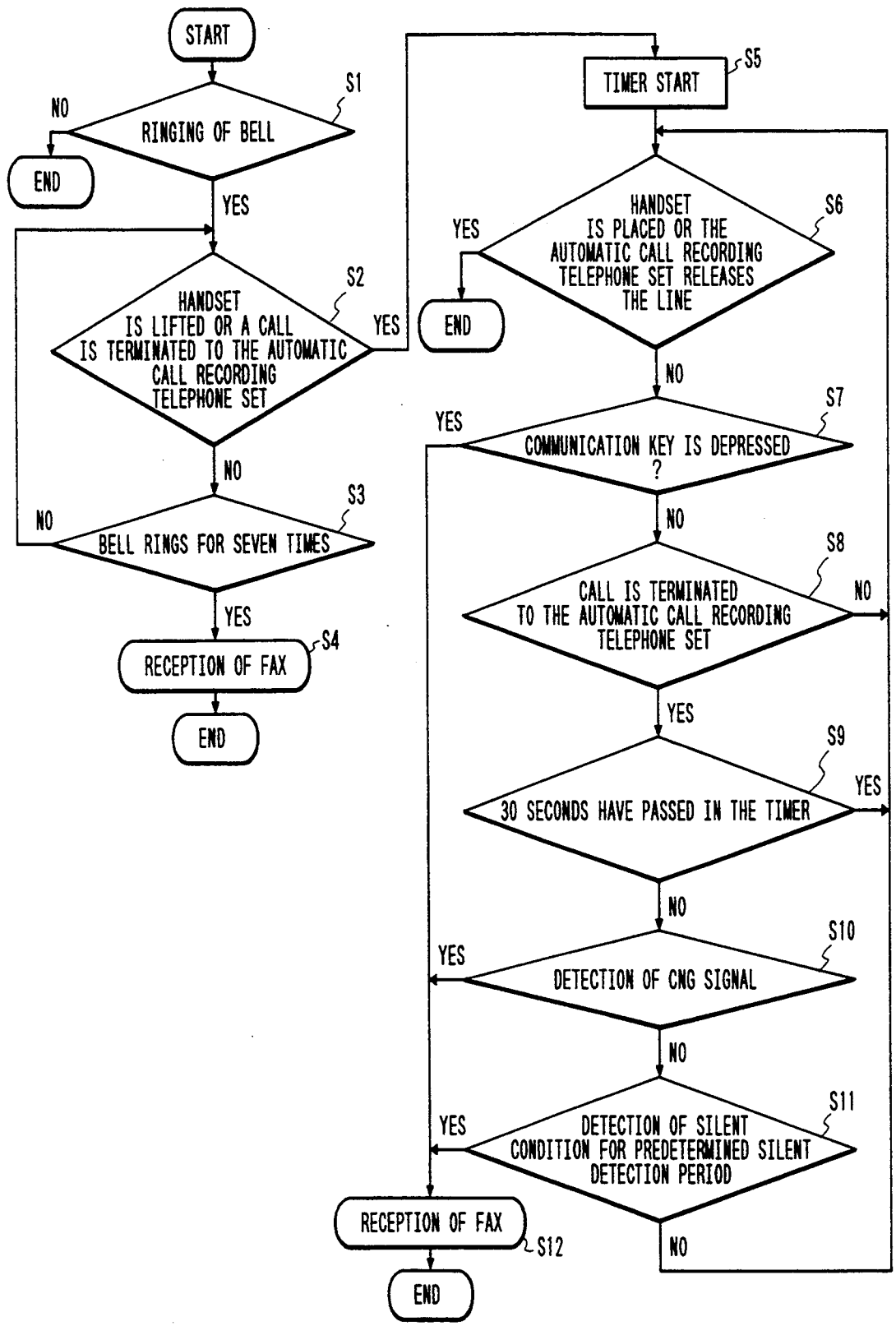

Receiving operations of the facsimile apparatus 1 will then be explained in accordance with the flowchart of FIG. 2. The CPU 7 decides, in response to an output signal from the incoming detecting circuit 18, whether or not a ringing signal of 16 Hz has been received from the exchange through the telephone line 4 (S1). Next, the CPU 7 counts the number of times of ringing signals terminated to the termination detecting circuit 18 and decides whether the handset of the TEL 1 has been lifted or whether the call has been terminated to the automatic call recording telephone set 6 (TEL 2) (S2). If the ringing signal can be heard twice or six times, then the call has been terminated to the automatic call recording telephone set 6.

When NO is decided in step 2, it is decided whether or not the number of times of ringing signal has reached 7 (S3). If the number of rings is under seven, then operation transfers to step 2 and when it becomes seven, the apparatus transfers to the facsimile reception process (S4). On the other hand, if a YES is decided in step S2, then the timer starts (S5).

Next, it is decided whether the handset is placed or whether or not the telephone line has been disconnected in the automatic call recording telephone set 6 (S6). If a YES decision is made at this step, then the process comes to the end.

Meanwhile, if a NO decision is made, then it is decided whether the communication key has been depressed or not (S7). If the communication key has been depressed, then the operation mode transfers to the facsimile reception (S12). If the communication key has not been depressed, it is decided whether or not a call is terminated to the automatic call recording telephone set 6 (S8).

When a call is not terminated to the automatic call recording telephone set 6 (namely, if it is an ordinary telephone call), the operation skips to step S9. Therefore, when an ordinary call is received, the CNG signal detecting process and the silent condition detecting process for the predetermined period are not executed.

On the other hand, when a call is terminated to the automatic call recording telephone set 6, the timer determining whether 30 seconds have passed (S9).

In this step, when 30 seconds have passed, the operation skips to step S6. Therefore, after 30 seconds have passed from the reception of the call to the automatic call recording telephone set, the CNG signal detecting process and the silent condition detecting process for predetermined period are not executed.

Meanwhile, if 30 seconds has not passed, then it is decided whether or not the CNG signal has been transmitted (S10). If the CNG signal has been transmitted, then the facsimile receiving process is executed considering that the distant party has automatically transmitted the facsimile signal (S12). If the CNG signal has not been transmitted, it is decided whether or not the silent condition is continued for the predetermined period (S11). If the silent condition is not continued for the predetermined period, then operation skips to step S6. Meanwhile, if the silent condition is continued for the predetermined period, then the facsimile receiving process is executed, considering that the distant party has manually transmitted the facsimile signal (S12).

According to the procedure explained above, detection of a silent condition for a second predetermined period is executed only during the first predetermined period after the start of a conversation with the automatic call recording telephone set 6. If the silent condition for the second predetermined period is detected during such first period, then the apparatus transfers to the facsimile reception mode. On the other hand, if the silent condition for the second predetermined period is not detected after the passage of the first predetermined period, and if the silent condition for the second predetermined period is detected thereafter, then the apparatus is not transferred to the facsimile reception mode. Namely, even if a silent condition for the second predetermined period is generated because voice communication has ceased during message recording, the automatic call recording condition is maintained and message recording can be continued.

Moreover, in this embodiment, when a person lifts the handset, the CNG signal is not detected and an unnecessary detecting step is eliminated. In addition, since the silent condition for predetermined period is not executed, the apparatus is not transferred to the facsimile reception mode if the silent condition is generated due to the cessation of voices during conversation.

In the case of connecting the automatic call recording telephone set 6, the transfer control between the automatic call recording mode and the facsimile reception mode can be executed, even when the automatic call recording telephone set 6 is connected to the terminal for TEL 1 or TEL 2, by enabling a user to connect the automatic call recording telephone set 6 to the terminal for TEL 1 or TEL 2 (for example, the terminal selection switch is operated for connecting the automatic call recording telephone set 6 to the terminal TEL 1).

Figure 3:
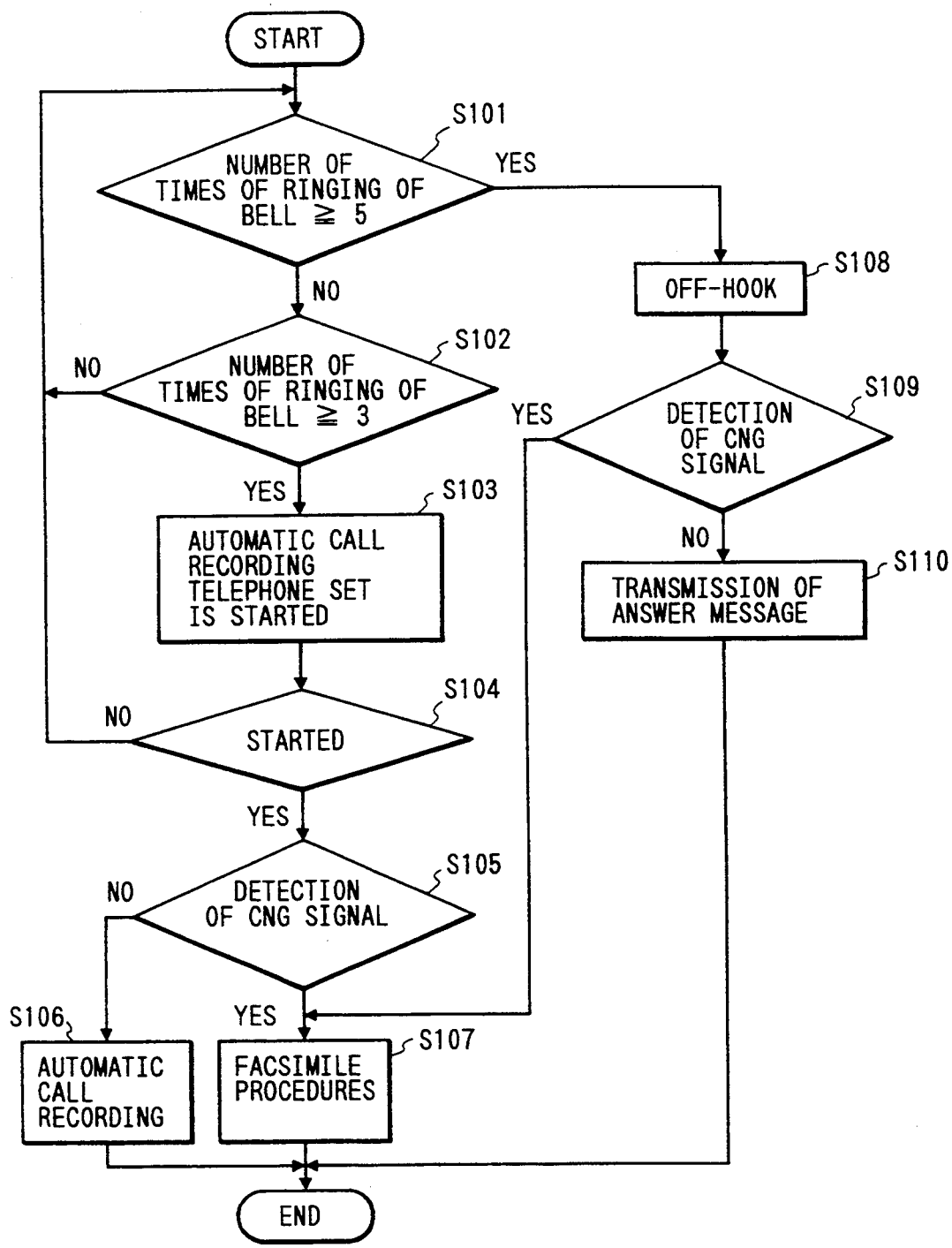
FIG. 3 is a flowchart for explaining an embodiment of the facsimile reception method of the present invention.
Figure 4:
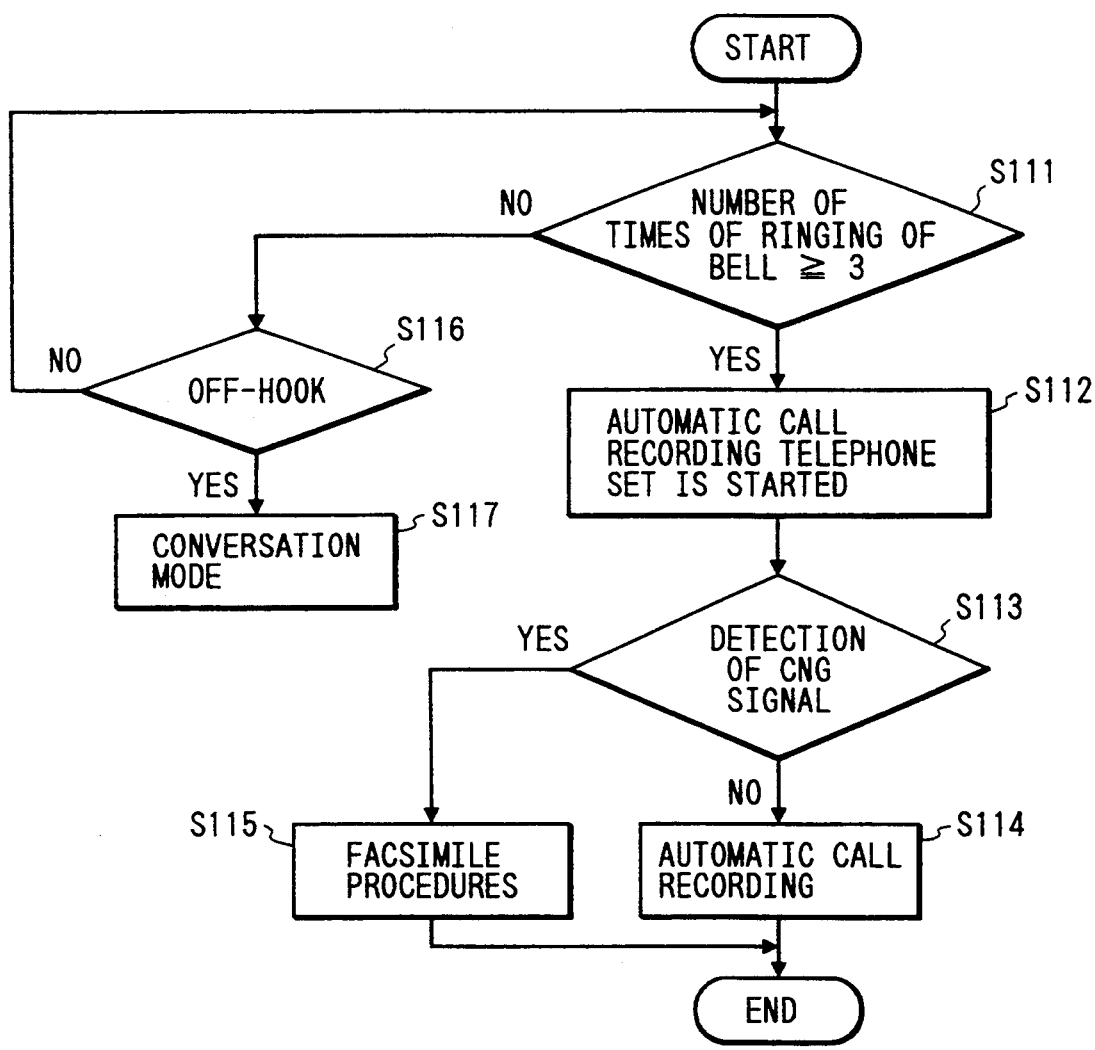
FIG. 4 is a flowchart for explaining the conventional automatic call recording/automatic facsimile reception switching mode.

Moreover, FIG. 3 is a flowchart for explaining an embodiment of the facsimile receiving method to which the present invention is applied. The flows of steps S116 and S117 explained with reference to FIG. 4 are omitted.

If the facsimile apparatus is set to the automatic call recording/automatic facsimile reception switching mode explained above, the flow of FIG. 3 starts when a call is received.

The number of times of ringing of bell is counted by looping steps S101 and S102. When the bell rings for a predetermined number of times, (for example, three times), the apparatus transfers to step S103 from step S102, allowing reception of a call by the automatic call recording telephone set. That is, the internal circuit of the facsimile apparatus establishes an off-hook condition, enabling connection to the telephone line. As explained above, when the automatic call recording telephone set is triggered, operation skips to step S105 from step S104 for the detection of a CNG signal. If a CNG signal is not received, then operation skips to step S106 to start a message transmitting unit and a recording unit for automatic call recording. If a CNG signal is detected in step S105, then operation skips to step S107 and the facsimile receiving procedures are executed.

The flow explained above can be applied to the normal operation of the facsimile apparatus. If a call cannot be terminated to the automatic call recording telephone set due to a failure as explained above, the operation of step S103 cannot be executed normally and the ringing condition is continued by looping to step S101 from step S104. When the number of rings reaches a value, (for example, five,) which is larger then the number of times of reception of call to the automatic call recording telephone set, operation skips too step S108 from step S101. In step S108, the receiving unit of the facsimile apparatus is started and the internal circuit first establishes the off-hook condition, realizing connection to the telephone line. When connection is set up, a CNG signal may be detected in step S109 as explained in step S105. If this signal is detected, operation skips to step S107 and the facsimile receiving procedures are established.

If a CNG signal is not detected in step S109, then operation skips to step S110 and enters the answer mode to transmit a message requesting further calling. In case a failure which allows transfer to the automatic call recording condition of the automatic call recording telephone set is assumed, it is also possible that operation skips to step S106.

In addition, it is also possible to decide that reception of call to the automatic call recording telephone set is detected when the bell rings for the predetermined number of times and if a call cannot be received, operation immediately skips to the step S108.

In any case, a call can be terminated to the facsimile unit when a call cannot be terminated to the automatic call recording telephone set. Therefore, the facsimile reception is never sacrificed if a fault occurs in the automatic call recording telephone set.

According to the present invention, even when the silent condition for predetermined period is generated during message recording at the automatic call recording telephone set, the automatic call recording condition may be maintained and message recording can be continued.

The present invention further provides the effect that transfer to the facsimile reception mode is realized in the facsimile apparatus having the automatic call recording mode when a call cannot be terminated to the automatic call recording telephone set and thereby facsimile reception mode can be maintained even in the automatic call recording-mode.

What is claimed is:

1. In a facsimile system having an automatic call recording mode and a facsimile reception mode, a facsimile receiving method comprising:

counting the number of ringing signals received by the system, switching the system to the automatic call recording mode after the number of ringing signals received exceeds a first number, determining whether the system has commenced automatic call recording, continuing to count the number of ringing signals received by the system after determining that the system has not commenced automatic call recording, and switching the system to the facsimile reception mode after the number of ringing signals received exceeds a second number, the system has not commenced automatic call recording and a CNG signal has been detected, the second number being greater than the first number.

* * * * *